W. S. DOWNING.
WRAPPING TOOL.
APPLICATION FILED OCT. 6, 1917.
1,266,002.
Patented May 14, 1918.
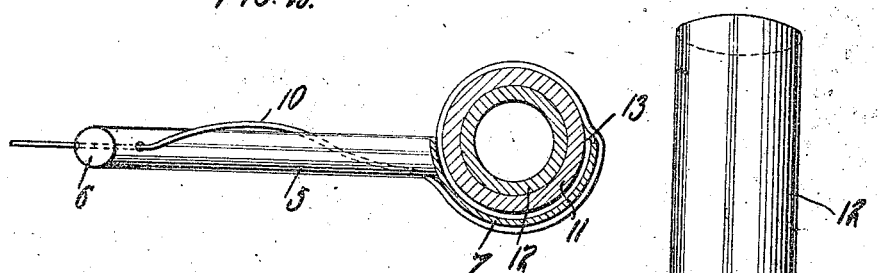
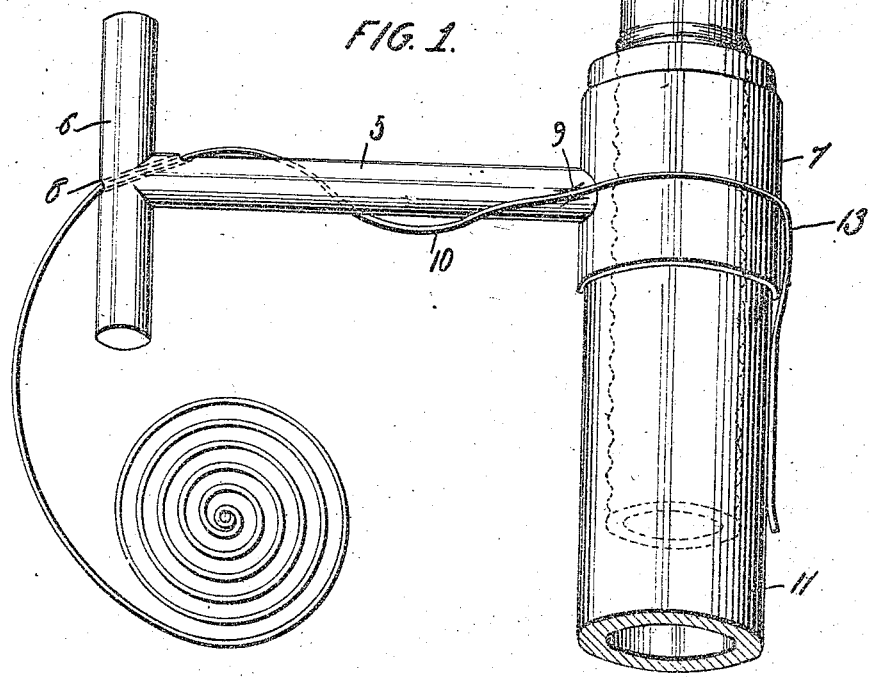
WITNESSES
INVENTOR
William S. Downing
BY
ATTORNEY

UNITED STATES PATENT OFFICE.

WILLIAM S. DOWNING, OF HOUGHTON, MICHIGAN.

WRAPPING-TOOL.

1,266,002.　　　　　Specification of Letters Patent.　　Patented May 14, 1918.

Application filed October 6, 1917. Serial No. 195,161.

*To all whom it may concern:*

Be it known that I, WILLIAM S. DOWNING, a subject of the King of Great Britain, and who has taken out his first papers to become a citizen of the United States, residing at Houghton, in the county of Houghton and State of Michigan, have invented certain new and useful Improvements in Wrapping-Tools, of which the following is a specification.

This invention relates to wrapping tools, and is adapted particularly for use in applying wire to work.

The primary object of the invention is to provide a tool of simple and inexpensive construction and which is capable of being easily and quickly operated to firmly bind a wire strand upon work, and is designed particularly in applying wire to the exterior of a flexible hose or tubing for binding the latter firmly upon the nipple or core thereof.

With this object in view together with others which will appear as the description proceeds, the invention resides in the novel formation, combination and arrangement of parts, all as will be more fully described hereinafter, illustrated in the drawings, and particularly pointed out in the claims.

In the drawing:

Figure 1 is a perspective view illustrating my improved wrapping tool, the view showing the manner in which the tool is operated, and Fig. 2 is a sectional view taken through the tool.

The tool embodying my invention is designed primarily for use in connection with the hose used for conveying air, water or steam under high pressure, and provides a simple and yet thoroughly efficient means for securely binding the hose end to the nipple so that the danger of pulling out or separating of adjoining hose ends is obviated.

The improved tool comprises a metallic shank 5, to one end of which a hand-grip 6 is connected, and the opposite end of the shank has secured thereto a plate or work-engaging element 7, preferably shaped so as to conform to the contour of the work. As the tool is adapted in this instance to be used in connecting the ends of hose, this plate is arcuate, and is substantially semi-circular in cross section. The shank 5 at the handle-end thereof is provided with an angularly disposed opening 8, the said opening being relatively short, and opens in the outer surface of the handle at one end, and at its opposite end upon the shank inwardly from the said handle. The shank adjacent the plate end thereof is provided with a guide 9, and the opening 8 and guide 9 are adapted to receive a strand of wire indicated at 10.

The hose is indicated at 11, and the nipple therefor is indicated at 12; the said nipple being of that type usually employed in connection with hose of this character, and having the corrugations upon its exterior surface, as shown.

In operating the tool, the wire 12 is threaded through the opening and is then passed under or spirally around the shank 5, and is then engaged in the guide 9. The wire at its extremity is bent so as to lie parallel with and engaging the hose 11, the said wire being bent sharply at 13 at the outer end of the plate 7 and intermediate the ends thereof. That portion of the wire strand which lies parallel with and engages against the hose is held firmly with the hand until after the tool has been rotated upon the hose end two or three times. The spiral winding of the wire strand 10 upon the shank 5 will properly tension the wire, and after the first few wrappings have been made, the hand holding the wire upon the hose may be removed, and repeated rotations of the tool will cause the wire to be firmly bound upon the hose and the wrappings will lie close together. It will be understood that this wrapping operation is performed upon the hose end directly over the corrugated portion of the nipple, so that the hose fabric will be forced into binding engagement with the said corrugated portion. If additional tension upon the wire strand be required, it will be understood that the strand may be passed spirally around the shank two or more times.

By this means of connecting the hose ends with their nipples, the more or less inefficient clamps now used may be dispensed with, and a tight gripping action between the nipple and hose end is created.

While the present is a disclosure of the preferred embodiment of the invention, it is to be understood that the invention is not limited thereto, as various changes in the minor details of construction, proportion and arrangement of parts may be resorted to if desired without departing from the spirit of the invention as defined by the appended claims.

What is claimed is:

1. In a wrapping tool, a shank, the said shank being provided at one end with an angularly disposed opening, an arcuate plate at the opposite end of said shank, a guide on said shank adjacent said plate, and the said guide being out of alinement with said opening, the said tool being adapted to have a wire strand extended through said opening and wound spirally around said shank and extended through said guide.

2. In a wrapping tool, a plate, a shank extending at right angles to said plate, a guide on said shank adjacent the juncture of the plate with the latter, the said shank having a hand grip comprising a pair of angularly disposed arms at its outer end, the said grip and shank having angularly disposed openings disposed at an angle to the said guide, whereby a strand passed through said openings and engaged in said guide will pass partly around the said shank.

In testimony whereof I affix my signature in presence of two witnesses.

WILLIAM S. DOWNING.

Witnesses:
JAMES BOWDEN,
WM. BOWDEN.